Oct. 12, 1926.
C. T. ALLCUTT
1,602,872
MEASURING DEVICE
Filed Feb. 3, 1923
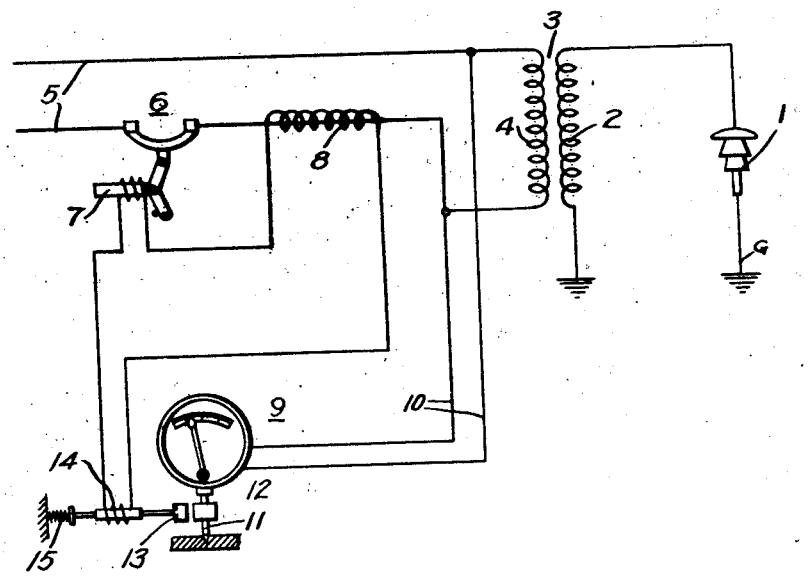
WITNESSES:
INVENTOR
Chester T. Allcutt
BY
ATTORNEY Patented Oct. 12, 1926.

1,602,872

UNITED STATES PATENT OFFICE.

CHESTER T. ALLCUTT, OF PITTSBURGH, PENNSYLVANIA, ASSIGNOR TO WESTINGHOUSE ELECTRIC & MANUFACTURING COMPANY, A CORPORATION OF PENNSYLVANIA.

MEASURING DEVICE.

Application filed February 3, 1923. Serial No. 616,763.

My invention relates to measuring devices and particularly to means for facilitating the taking of measurements therewith.

The object of my invention is to provide an electrical measuring instrument that shall be held in the position indicating the value of the quantity existing at the time the influence thereof is removed and that shall thereafter be automatically conditioned to resume its indicating function.

In the prior art, it has been usual, as in maximum demand meters, to provide a frictionally pivoted pointer that is moved by another pointer actuated directly by the meter mechanism. This construction permits the maximum demand pointer to remain in its maximum position until it is reset by hand, and illustrates one form of meter known to me, which holds or retains an indication after the influence causing it has been withdrawn.

However, such an arrangement is more adapted for instruments having considerable torque, and is ordinarily not employed in very sensitive instruments wherein the pointer or other indicating member should oppose, as little as possible, the influence causing it to indicate.

In conducting certain electrical tests, such as determining the corona-forming and flashover voltage values of a high-potential insulator, it has been usual to employ a sensitive voltmeter of the ordinary type, the pointer of which rapidly returns to the zero position, when the influence causing it to indicate is removed.

Thus, the operator's attention must be directed to the instrument in order to determine the flash-over voltage because, at this voltage, the instrument circuit is broken and the pointer returns to zero position.

It is highly desirable that the operator, in such tests, be free to study the character and location of corona, as well as the particular nature of the flashover arc, but as above pointed out, he cannot do this with a usual voltmeter and at the same time determine the flashover voltage, without the aid of an assistant.

In practicing my invention, I provide a measuring instrument having a normally freely movable element and automatically actuated braking or holding means for retaining the indicating member in its position of last indication or, as in a flashover test for an insulator, the position indicating the voltage value at which the insulator flashed. The holding means is also adapted to automatically release the meter element when energized for a subsequent test, so that the operator is free to direct his attention to the object to be tested rather than to the testing instrument.

The single figure of the accompanying drawing is a diagrammatic view of a system in which my invention is embodied.

A high potential insulator 1 is connected, at one terminal, to a ground connection G and, at its other terminal, to one terminal of the high-voltage secondary winding 2 of a transformer 3, the other terminal of the winding 2 of which is also grounded.

The low tension primary winding 4 of the transformer 3 is connected to supply conductors 5 through a circuit interrupter 6 that is adapted to be opened by an electromagnet 7 connected in series with a current transformer 8.

A voltmeter 9, preferably graduated in terms of the voltage on the high-tension side of the transformer 2, is connected by leads 10 across the conductors 5.

A shaft 11, that may constitute a part of, or be connected to, the movable element of the meter 9, is provided with a brake drum, or other suitable device 12, for co-operation with a holding or locking member 13. The latter is adapted to be actuated by an electromagnet 14 that is connected in the circuit of the transformer 8, and is biased to operative or holding position, by a spring 15 against the action of the magnet 14.

In operation, when the circuit interrupter 6 is closed, the electromagnet 14 disengages the member 13 from the member 12 to thus permit the instrument 9 to operate in a usual manner.

When an arc occurs across the terminals of the insulator 1, the high-tension winding 2 is short-circuited to cause a rush of current in the conductors 5. This action causes the electromagnet 7 to automatically trip the circuit interrupter 6 and to thus de-energize the electromagnet 14 which, when so de-energized, permits the member 13 to engage the member 12 to hold the movable element of the meter 9 in the position indicating the value of the voltage which caused the insulator to break down.

The device of my invention desirably facilitates such tests and requires no additional attention on the operator's part, after being initially connected in circuit.

While I have shown and described a particular form of my invention, changes may be effected therein without departing from the spirit and scope thereof, as set forth in the appended claims.

I claim as my invention:

1. The combination with an electric circuit, a circuit interrupter therefor and an indicating member operatively connected thereto, of means responsive to the opening of said circuit by said interrupter for stopping and holding the indicating member at a predetermined indicating position and responsive to the closing of said circuit by the interrupter for releasing the indicating member to resume its indicating function.

2. The combination with a measuring instrument, and a movable indicating member therein responsive to conditions in a circuit, of a device responsive to the opening of said circuit for stopping the indicating member and to the closing of the circuit for releasing the indicating member.

3. The combination with a measuring instrument, and a movable indicating member therein responsive to conditions in a circuit, of an electromagnetic device controlled by the opening of said circuit for stopping the indicating member and to the closing of the circuit for releasing the indicating member.

4. The combination with a circuit, a circuit interrupter and indicating means, of means for automatically operating said interrupter to its open position in accordance with a predetermined circuit condition and for retaining said indicating means in condition to subsequently indicate the value of a quantity of the circuit existing at approximately the time of the interruption.

5. The combination with a circuit, a circuit interrupter and indicating means, of an auxiliary circuit responsive to a predetermined condition in said first circuit and including means for actuating said interrupter and for controlling said indicating means.

6. The combination with a circuit, a circuit interrupter and indicating means, of an auxiliary circuit responsive to a predetermined condition in said first circuit and including means for actuating said interrupter and means for retaining said indicating means in the condition thereof at the time of actuation of said interrupter.

In testimony whereof, I have hereunto subscribed my name this 26th day of January, 1923.

CHESTER T. ALLCUTT.